(12) United States Patent
Aratani et al.

(10) Patent No.: US 7,469,054 B2
(45) Date of Patent: Dec. 23, 2008

(54) IMAGE DISPLAYING METHOD AND IMAGE DISPLAYING APPARATUS

(75) Inventors: Shuntaro Aratani, Tokyo (JP); Tomoyuki Ohno, Zama (JP); Katsuhiro Miyamoto, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 592 days.

(21) Appl. No.: 11/002,130

(22) Filed: Dec. 3, 2004

(65) Prior Publication Data

US 2005/0128221 A1 Jun. 16, 2005

(30) Foreign Application Priority Data

Dec. 16, 2003 (JP) ............... 2003-418542

(51) Int. Cl.
*G06K 9/00* (2006.01)
*G09G 5/00* (2006.01)

(52) U.S. Cl. ..................... 382/118; 345/619

(58) Field of Classification Search ........... 382/118, 382/190, 282, 298; 345/619, 667, 670, 671; 348/569, 700, 561, 581
See application file for complete search history.

(56) References Cited

U.S. PATENT DOCUMENTS

| | | | |
|---|---|---|---|
| 6,191,811 B1 * | 2/2001 | Nishimura et al. | 348/96 |
| 6,297,846 B1 | 10/2001 | Edanami | 348/239 |
| 6,362,850 B1 | 3/2002 | Alsing et al. | 348/239 |
| 6,560,374 B1 | 5/2003 | Enomoto | 382/284 |
| 6,883,140 B1 * | 4/2005 | Acker et al. | 715/730 |
| 6,928,613 B1 * | 8/2005 | Ishii et al. | 715/726 |
| 6,937,764 B2 * | 8/2005 | Sakamoto et al. | 382/195 |
| 7,006,091 B2 * | 2/2006 | Masera et al. | 345/428 |
| 7,317,815 B2 * | 1/2008 | Steinberg et al. | 382/118 |
| 2002/0181784 A1 | 12/2002 | Shiratani | 382/218 |
| 2003/0076429 A1 * | 4/2003 | Karasaki et al. | 348/240.2 |
| 2003/0135539 A1 * | 7/2003 | Kondo et al. | 709/201 |
| 2005/0117032 A1 * | 6/2005 | Ueda et al. | 348/231.4 |
| 2005/0190415 A1 * | 9/2005 | Ueda | 358/505 |

FOREIGN PATENT DOCUMENTS

| | | |
|---|---|---|
| EP | 0 889 638 A2 | 1/1999 |
| EP | 1 235 182 A2 | 8/2002 |
| JP | 10-51755 A | 2/1998 |
| JP | 11-243484 | 9/1999 |
| JP | 2000-69277 | 3/2000 |
| JP | 2002-281450 | 9/2002 |
| JP | 2002-358522 A | 12/2002 |
| JP | 2003-78743 | 3/2003 |

* cited by examiner

*Primary Examiner*—Daniel G Mariam
(74) *Attorney, Agent, or Firm*—Fitzpatrick, Cella, Harper & Scinto

(57) ABSTRACT

In a slide show, image displaying method and apparatus are provided that can automatically set a display effect suitable for a picture on the basis of information proper to individual pictures. After at least one image data is obtained, in executing a slide show of this image, characteristic areas such as faces in the image are detected, and a display effect is selected from a plurality of predetermined display effects on the basis of the number and/or size of the characteristic areas. The image is displayed while being changed in time series on the basis of this selected display effect.

6 Claims, 15 Drawing Sheets

| NUMBER OF DETECTED FACES | DISPLAY EFFECT |
|---|---|
| 1 | DISPLAY WHOLE → ZOOM TO FACE POSITION |
| 2 | PAN ON THE LINE PASSING THROUGH THE TWO FACES IN A ZOOMED STATE |
| 3 OR MORE | ENLARGED DISPLAY OF THE CENTER-OF-GRAVITY POSITION OF ALL THE FACE POSITIONS → ZOOM OUT TO THE WHOLE IMAGE |
| 0 | DISPLAY WHOLE IMAGE → ZOOM OUT |

Fig. 4

Fig. 5A
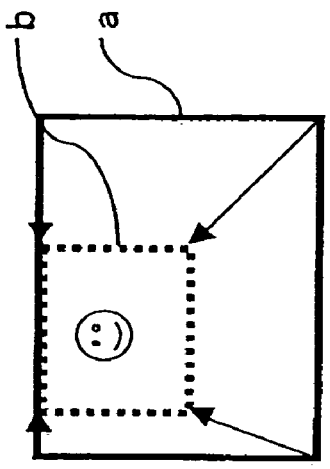
NUMBER OF DETECTED FACES: 1
FACE POSITION: (674, 288)
Fig. 5B
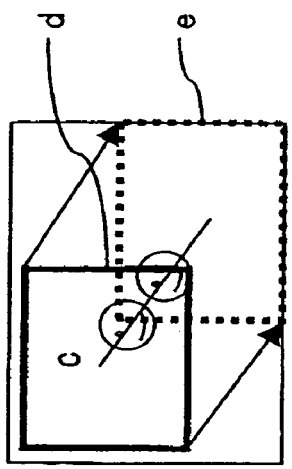
NUMBER OF DETECTED FACES: 2
FACE POSITION:
(650, 456) (840, 596)
Fig. 5C
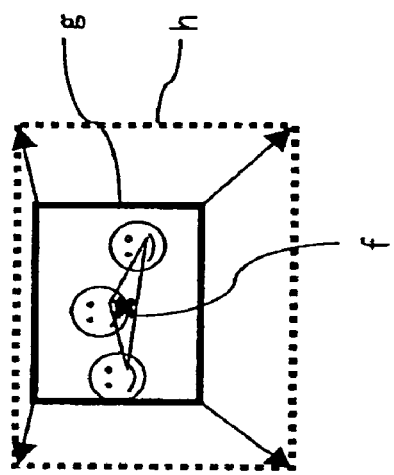
NUMBER OF DETECTED FACES: 3
FACE POSITION: (826, 320)
(1171, 421)
(476, 392)

| NUMBER OF DETECTED FACES | DISPLAY EFFECT |
|---|---|
| 1 | WHEN THE SIZE WIDTH OF THE FACE AREA IS 130 OR MORE: DISPLAY WHOLE → ZOOM TO FACE POSITION WHEN THE SIZE WIDTH IS LESS THAN 130: WINDOW FRAME DISPLAY ONLY FOR THE NEIGHBORHOOD OF THE FACE AREA → ENLARGE THE FRAME FOR DISPLAY OF WHOLE |
| 2 | PAN ON THE LINE PASSING THROUGH THE TWO FACES IN AN ENLARGED STATE |
| 3 OR MORE | ENLARGED DISPLAY OF THE CENTER-OF-GRAVITY POSITION OF ALL THE FACE POSITIONS → ZOOM OUT TO THE WHOLE IMAGE |
| 0 | DISPLAY WHOLE IMAGE → ZOOM OUT |

*Fig. 7*

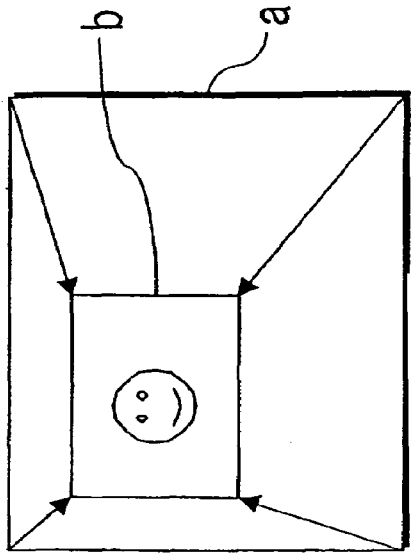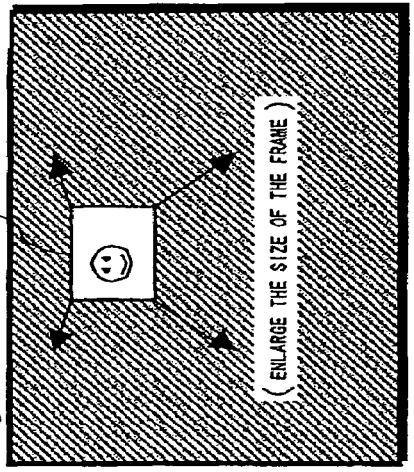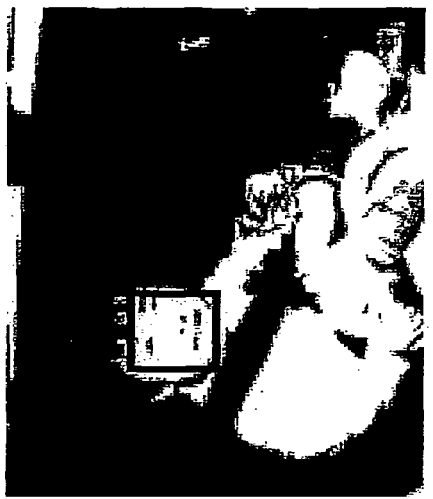
Fig.8C  Fig.8D
Fig.8A
NUMBER OF DETECTED FACES:1,
FACE POSITION:(557,496), SIZE:W252,H228
Fig.8B
NUMBER OF DETECTED FACES:1,
FACE POSITION:(674,288), SIZE:W124,H102

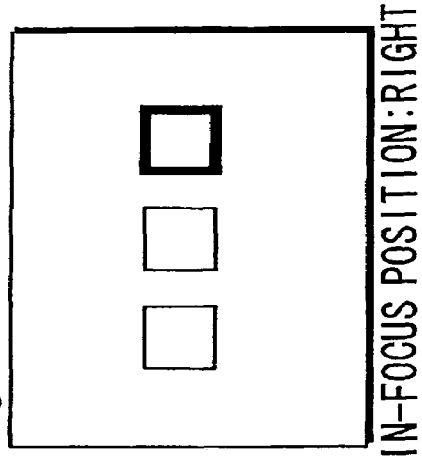
Fig.11B  IN-FOCUS POSITION:RIGHT
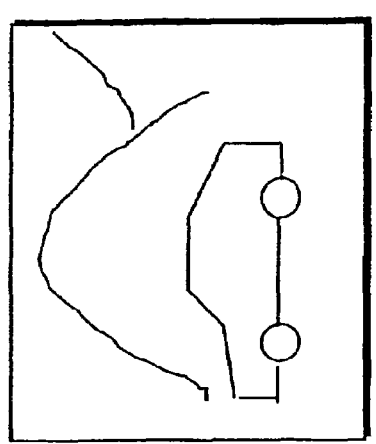
Fig.11D  ENLARGED VIEWING/LISTENING HISTORY: CENTER(450,800) SIZE(800×600)
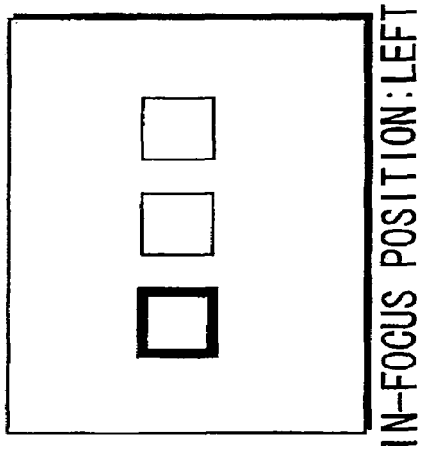
Fig.11A  IN-FOCUS POSITION:LEFT
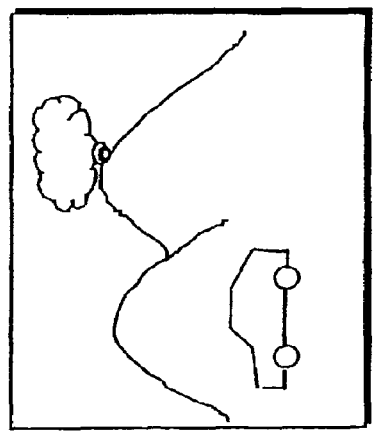
Fig.11C

| DUPLICATED AREAS | (NUMBER OF AREAS) | DISPLAY EFFECT |
|---|---|---|
| ONE | | DISPLAY WHOLE → ZOOM TO THE DUPLICATED AREA (MAGNIFICATION: HIGH) |
| TWO | | PAN FROM ONE AREA TO THE OTHER AREA IN A ZOOMED STATE (MAGNIFICATION:HIGH) |
| THREE OR MORE | | ZOOM TO THE FIRST AREA (MAGNIFICATION:HIGH), THEN PAN TO THE SECOND AND SUBSEQUENT AREAS |
| NONE | THERE IS ONLY ONE AREA | ZOOM OUT FROM THE ZOOMED DISPLAY (MAGNIFICATION: LOW) OF THE CENTER |
| | THERE ARE TWO AREAS LOCATED AWAY FROM EACH OTHER | SINGLE ZOOMING (MAGNIFICATION:LOW) |
| | THERE ARE THREE OR MORE AREAS | ZOOM OUT FROM THE ZOOMED DISPLAY NEAR THE CENTER-OF-GRAVITY POSITION OF ALL THE AREAS TO THE DISPLAY OF WHOLE |
| | THERE ARE NO AREAS | PAN FROM ONE TO THE OTHER IN A ZOOMED STATE (MAGNIFICATION: LOW) |

Fig.13

IMAGE DISPLAYING METHOD AND IMAGE DISPLAYING APPARATUS

BACKGROUND OF THE INVENTION

1. Field of the Invention

The present invention relates to an image displaying method and an image displaying apparatus, and is in particular suitable when applied to an image displaying apparatus that displays image data on a screen.

2. Description of the Related Art

Digital high vision broadcast has been started and, by the spread of television receiving apparatus conforming to high vision, one can enjoy video images having a higher image quality and being more impressive than before, at home. On the other hand, by the spread of electronic still cameras, an increasing number of users are enjoying digitized still images and moving images by displaying the images not only on a personal computer screen but also on a television monitor screen.

Under these circumstances, there is an increasing need of the users that the users wish not only to display captured still images and moving images on a television screen but also to view and listen to the images "passively" as in a television program, or to enjoy the images in a form of being imparted with stage effects or video and sound effects such as in a television program or a movie.

Here, a slide show display can be raised as a method of successively displaying digital video image data without an operation of a user. A method disclosed in Japanese Laid-open Patent Publication 2002-281450 is proposed as a method of adding effects to this slide show display. This Japanese Laid-open Patent Publication 2002-281450 discloses, as a conventional example, a method of controlling display switching effects in accordance with the display switching effect setting that is imparted beforehand to still images, and also discloses a method by which the user can freely change to other display switching effects, and the like.

However, the technique proposed in Japanese Laid-open Patent Publication 2002-281450 requires a work of the producer of the contents to add effects in order to add effective display effects to a slide show. For this reason, according to the technique disclosed in Japanese Laid-open Patent Publication 2002-281450, the user can merely exchange the switching effect controlling commands of still images with other switching effect controlling commands. In other words, the prior art raises a problem in that it is difficult to produce the display effects suitable for the contents of individual photographs automatically or in a simple manner.

SUMMARY OF THE INVENTION

Thus, an object of the present invention is to provide an image displaying method and an image displaying apparatus capable of automatically setting the display effects suitable for photographs on the basis of the information proper to individual images in performing a slide show in a displaying apparatus.

In order to achieve the aforementioned object, the first invention of the present invention is an image displaying method comprising:

an image inputting step of inputting an image;

a characteristic area detecting step of detecting characteristic areas in the image;

a display effect selecting step of selecting a display effect from a plurality of predetermined display effects on the basis of the number and/or size of the characteristic areas; and a displaying step of displaying the image while changing the image in accordance with the selected display effect.

The second invention of the present invention is an image processing method comprising:

an image inputting step of inputting an image;

a characteristic area detecting step of detecting characteristic areas in the image;

a display effect selecting step of selecting a display effect from a plurality of predetermined display effects on the basis of the number and/or size of the characteristic areas; and a video image signal outputting step of outputting a video image signal for displaying the image while changing the image in accordance with the selected display effect.

In addition, the present invention includes a computer program for making a computer execute the image displaying method according to the first invention and/or the image processing method according to the second invention, and a recording medium that stores this computer program.

The third invention of the present invention is an image displaying apparatus comprising:

displaying means for displaying an image;

image data obtaining means for obtaining image data;

characteristic area detecting means for detecting characteristic areas in the image;

display effect selecting means for selecting a display effect from a plurality of predetermined display effects on the basis of the number and/or size of the characteristic areas; and display controlling means for displaying the image on the displaying means while changing the image in accordance with the selected display effect.

The fourth invention of the present invention is a television-receiving apparatus including an image displaying apparatus according to the third invention and a tuner section for outputting video image data by receiving a digital broadcast, wherein the display controlling means controls to display a video image on the displaying means on the basis of said video image data.

The fifth invention of the present invention is an image processing apparatus comprising:

image data obtaining means for obtaining image data;

characteristic area detecting means for detecting characteristic areas in the image;

display effect selecting means for selecting a display effect from a plurality of predetermined display effects on the basis of the number and/or size of the characteristic areas; and display controlling means for outputting a video image signal for displaying the image on displaying means while changing the image in accordance with the selected display effect.

According to the image displaying method and the image displaying apparatus of the present invention, the display effect for displaying an image in a slide show can be made a more effective one reflecting the contents of the image without requiring the user to perform a cumbersome setting operation.

BRIEF DESCRIPTION OF THE DRAWINGS

The invention, together with further advantages thereof, may best be understood by reference to the following description taken in conjunction with the accompanying drawings in which:

FIG. 4 is a schematic line view showing an example of an information table used for decision of the parameters of the display effects by the display control section according to the first embodiment of the present invention;

FIGS. 5A to 5C are schematic line views showing a function of a display effect selection process according to the first embodiment of the present invention;

FIG. 7 is a schematic line view showing an example of an information table used for decision of the parameters of the display effects by the display control section according to the second embodiment of the present invention;

FIGS. 8A to 8D are schematic line views showing a function of a display effect selection process according to the second embodiment of the present invention;

FIGS. 11A and 11B are views showing an example of a monitor of a digital camera that can record an in-focus position in the third embodiment of the present invention;

FIGS. 11C and 11D are schematic line views showing an example in storing operation history information in the third embodiment of the present invention;

FIG. 13 is a schematic line view showing an example of an information table used for decision of the parameters of the display effects by the display control section according to the third embodiment of the present invention;

DESCRIPTION OF THE PREFERRED EMBODIMENTS

Figure 1:
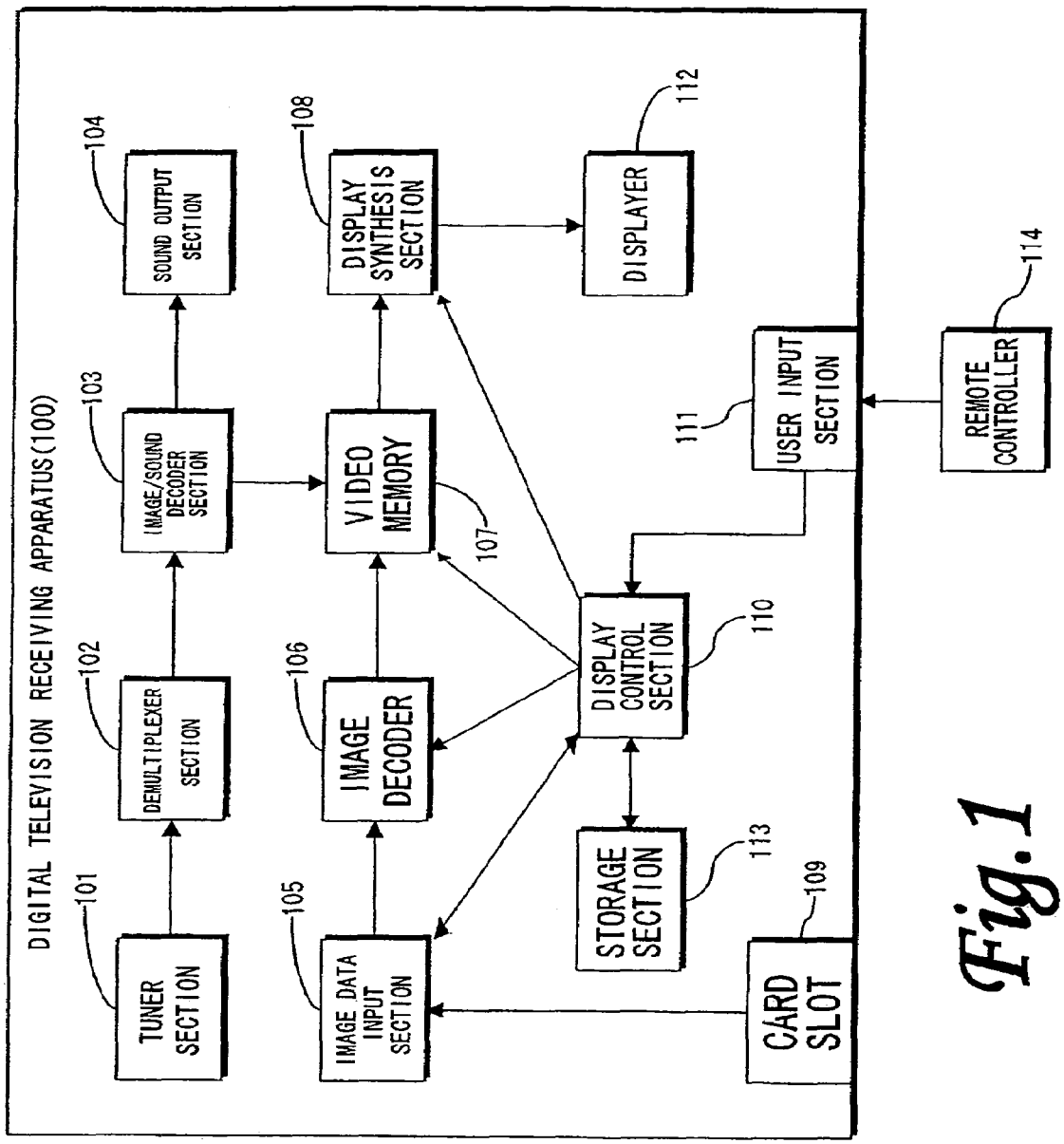
FIG. 1 is a block diagram showing a construction of a television receiver according to the first embodiment of the present invention.

Hereafter, embodiments of the present invention will be described with reference to the attached drawings. Here, in all of the views of the following embodiments, the same or the corresponding parts will be denoted with the same reference numerals.

First Embodiment

First, a digital television receiving apparatus serving as an image displaying apparatus according to the first embodiment of the present invention will be described. FIG. 1 shows a digital television receiving apparatus according to this first embodiment.

(Construction of Digital Television Receiving Apparatus)

Referring to FIG. 1, a signal received from an antenna (not shown) is input into a tuner section 101. Tuner section 101 performs processes such as demodulation and correction of errors on the input signal and creates a digital data in a form called a transport stream. Tuner section 101 further performs a descrambling releasing process on the created transport stream (TS) data and outputs the processed data to a demultiplexer section 102.

Video image data and sound data for a plurality of channels as well as electronic program guide (EPG) data and others are supplied from tuner section 101 to demultiplexer section 102. Also, demultiplexer section 102 extracts video image data and sound data from the time-divided and multiplied TS data such as the data supplied from tuner section 101 and broadcasting data, and outputs the extracted data to a video/sound decoder 103. The video image data processed by the video/sound decoder are written into a video memory 107, and output to a displayer 112 via a display synthesis section 108. On the other hand, the sound data are supplied to a sound output section 104.

In this first embodiment, the displayer 112 to be used is constituted of pixels with lateral 960 pixels and longitudinal 720 pixels (960×720 pixels) Here, this number of pixels is only an example, so that one can use a displayer 112 having any number of pixels.

A card slot 109 is an interface that is connected to a removable memory card or the like and is used for exchanging data with a digital camera, for example. An image data input section 105 is a circuit for reading digital image data from a memory card that is connected to card slot 109. An image decoder 106 is a circuit for performing a decoding process on the digital image data that are input from the image data input section.

A display control section 110 is process controlling means for giving an instruction of reading images to image data input section 105, giving an instruction of executing a process to image decoder 106, writing display data into video memory 107, giving an instruction of a synthesizing process to display synthesis section 108, and giving an instruction of storing information to a storage section 113.

Further, display control section 110 includes a computer so as to obtain input data from a remote controller 114 via a user input section 111 and to obtain image-capturing data imparted to digital image data via image data input section 105. Here, these constituent elements need not necessarily be housed as an integrated unit. Specifically, for example, it is possible to adopt a construction in which a hard disk drive (HDD) or a set top box (STB) serving as image processing apparatuses incorporating a HDD is housed as a unit separate from the displayer, wherein a video image signal for displaying a video image is transmitted from the image processing apparatus to the displayer.

Figure 2:
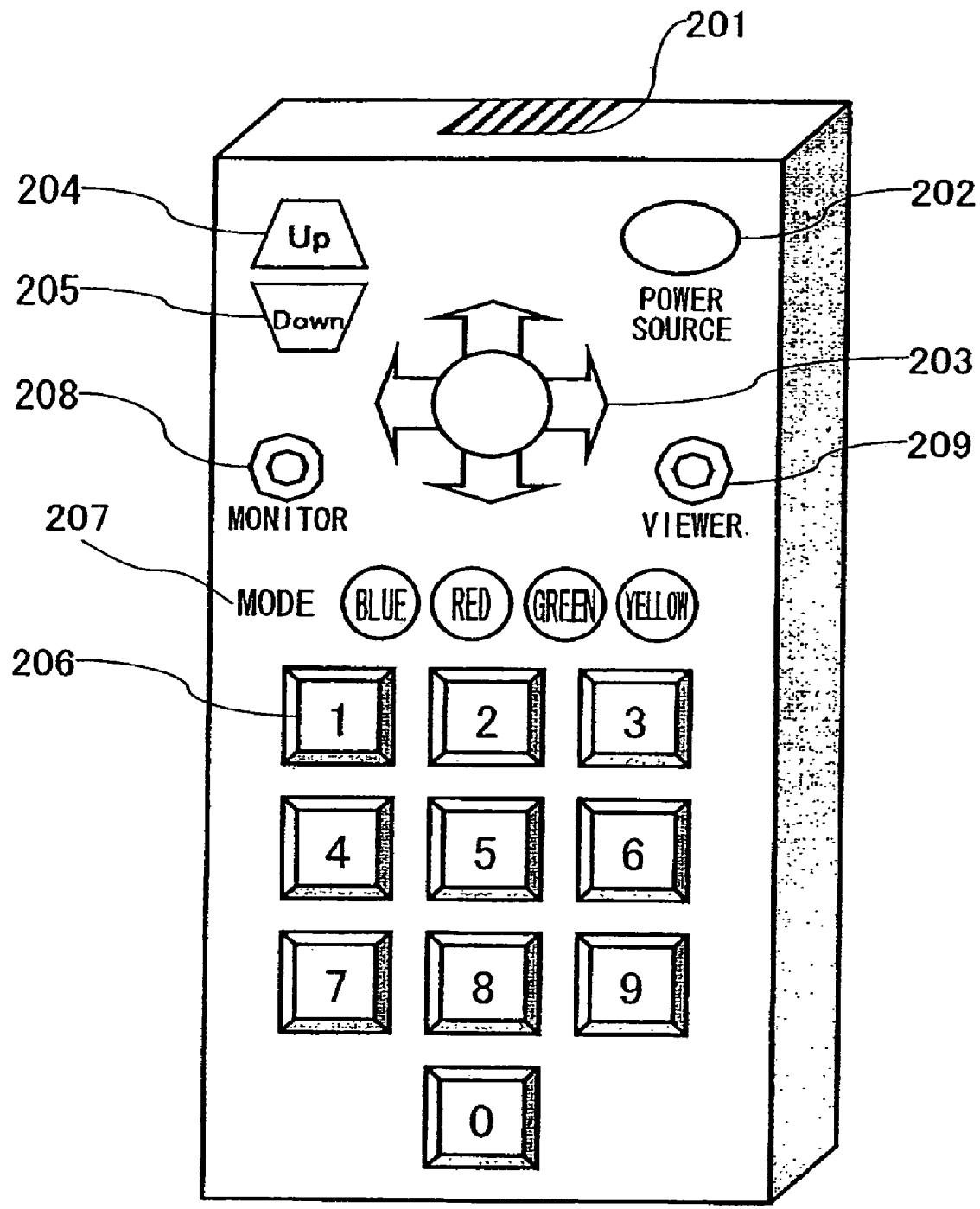
FIG. 2 is a schematic line view showing a remote controlling device of the television receiver according to the first embodiment of the present invention.

One example of this remote controller 114 is shown in FIG. 2. Here, in FIG. 2, only the buttons that perform operations to realize the functions necessary for the description of the first embodiment are shown. Therefore, the buttons needed in remote controller 114 in an actual receiving apparatus are not limited to those shown in FIG. 2.

As shown in FIG. 2, a light-emitting section 201 is light-emitting means for performing infrared ray communication between the remote controller and a light-receiving section of user input section 111 shown in FIG. 1. A power source key 202 is switching means for turning the power on/off. A cursor/ decision key 203 is a key for moving a cursor on a screen or making decisions at predetermined positions, where a decision key is disposed at the center of the up, down, left, and right keys. Up and down keys 204 and 205 are respectively made of two Up/Down keys. Number keys 206 are a series of numerals 1, 2, . . . , 9, 0 arranged in a matrix form. A color key 207 is made of four buttons colored in blue, red, green, and yellow that are arranged in a lateral row.

A monitor mode key 208 is a key for switching a display mode of a monitor of the television receiver. A "viewer" key 209 is a key for recalling an image viewer function.

The digital images used in this first embodiment are, for example, still image data captured with a digital camera. These still image data are data subjected to a compression process into predetermined image compression form data, for example, data subjected to a JPEG compression process, by a digital camera. After being subjected to the compression process, the still image data are recorded into a memory card as a still image data file. Here, in the following description, an "image file" represents still image data. Also, for simplification of the description, the still image data used in this first embodiment are all assumed to be data having a size of 1600×1200.

(Description of Processing Operation)

Next, a processing operation according to the first embodiment will be described.

Figure 3:
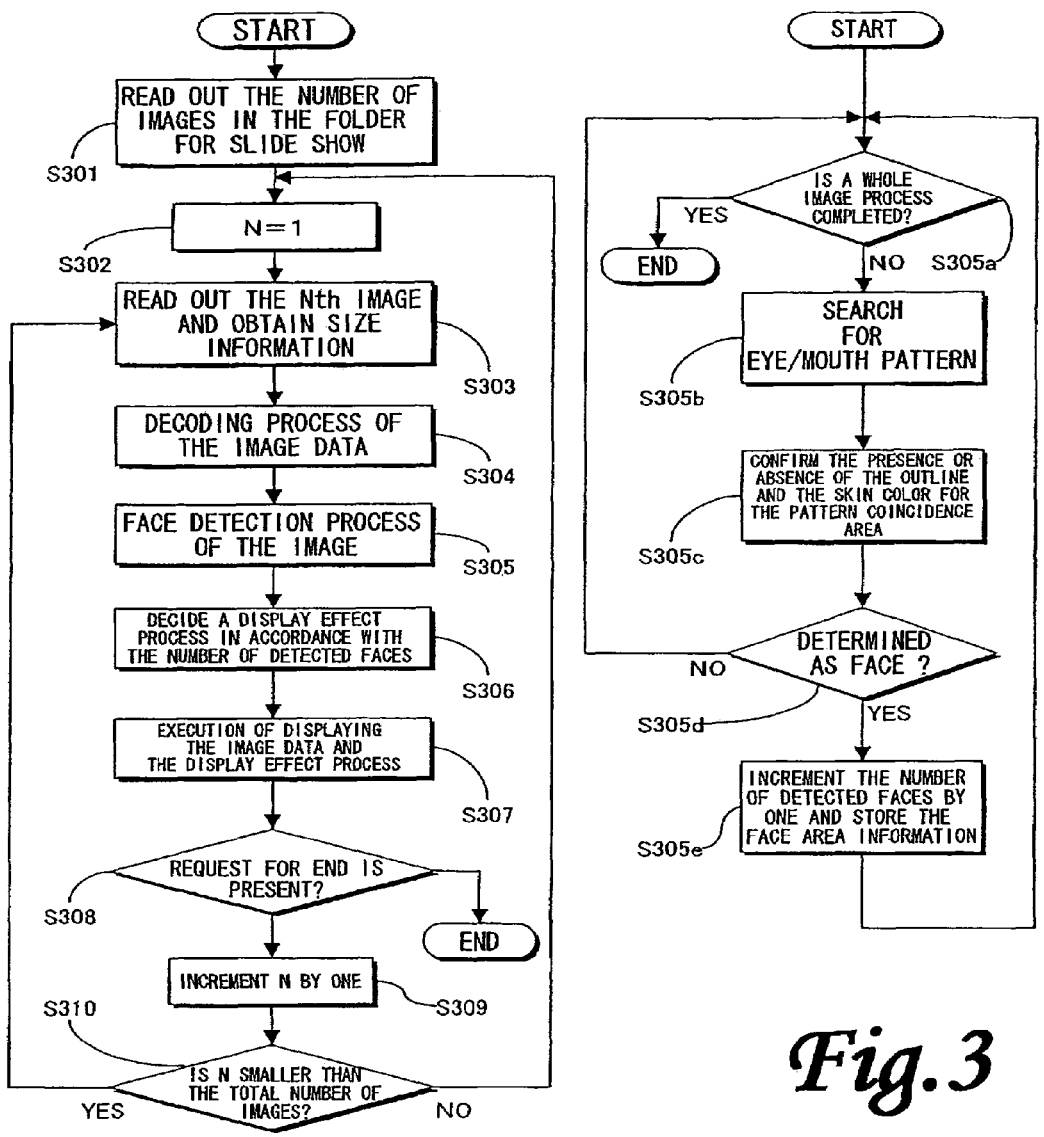
FIG. 3 is a flow chart showing an operation of a display control section according to the first embodiment of the present invention.
Figure 6A:
FIGS. 6A to 6H are schematic line views showing a display example according to the first embodiment of the present invention.
Figure 6B:
Figure 6C:
Figure 6D:
Figure 6E:
Figure 6F:
Figure 6G:
Figure 6H:
Figure 9A:
FIGS. 9A to 9H are schematic line views showing a display example according to the second embodiment of the present invention.
Figure 9B:
Figure 9C:
Figure 9D:
Figure 9E:
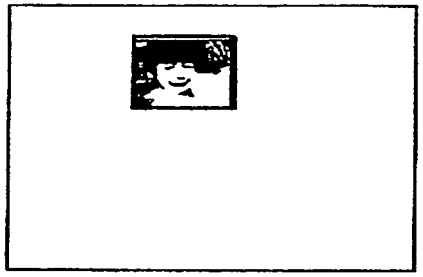
Figure 9F:
Figure 9G:
Figure 9H:

The display of digital images in digital television receiving apparatus 100 according to the first embodiment is started, for example, by recalling an image viewer function when a memory card is mounted to card slot 109 by a user and a remote controller is operated. FIG. 3 shows part of an operation of the image viewer function of the digital television receiving apparatus according to the first embodiment. Here, in FIG. 3, mainly the operation of display control section 110 will be shown.

(Start of Slide Show)

When "viewer" key 209 of the remote controller shown in FIG. 2 is pressed by a user, the process shown in FIG. 3 is started by display control section 110.

First, in step S301, display control section 110 reads out the total number of image files stored in the memory card inserted in card slot 109 via image data input section 105, and this value is stored. Next, the procedure goes successively to step S302 and step S303, whereby the first sheet of image file is read out and the image size is obtained. Thereafter, the procedure goes to step S304, where display control section 110 supplies image data to image decoder section 106, and this image decoder section 106 executes a decoding process on the image data. Subsequently, the procedure goes to step S305, where a face detection process is executed using the image subjected to the decoding process. Here, this face detection process will be described in detail below.

(Face Detection Process)

Namely, this face detection process according to the first embodiment is a process of searching for an eye or mouth pattern constituting the characteristics of a face in an image and, when the pattern coincides with a predetermined pattern, confirming the presence or absence of skin color and the presence or absence of an outline to determine whether the pattern constitutes a face or not.

In this first embodiment, this face detection process is executed as in step S305a to step S305e of FIG. 3. Namely, when it is determined as a face in this face detection process, the number of detected faces is incremented by one, and this number of the detected faces together with the positional information of the face ((X, Y) coordinates with a base point at the upper left end of the image data) are respectively stored in storage section 113.

(Effect Decision Process Corresponding to the Number of Detections)

When the face detection process on the first sheet of the image is finished, the procedure goes to step S306, where a display effect selection process on the first sheet is executed on the basis of the result of the face detection process. In this first embodiment, a display effect corresponding to the number of detected faces is selected using a table shown in FIG. 4.

Specifically, for example, if the number of detected faces is one, a display effect process of "display whole→zoom to face position" is selected by display control section 110 in accordance with the table shown in FIG. 4. If the number of detected faces is two, a display effect of "pan on the line passing through the two faces in a zoomed state" is selected. Further, if the number of detected faces is three or more, a display effect of "zoomed display of the center-of-gravity position of all the face positions→zoom out to the whole image" is selected. If no face has been detected, a display effect of "display whole→zoom out" is selected. Here, the terms "zoom" and "zooming" in meaning are not limited to execution of an enlargement process by cutting out a part of the image data. Namely, in the case of an image data of "1600×1200" used as one example in this first embodiment, the state in which this image data is subjected to a contraction process to display the data over the whole screen (960×720) is considered as a base, and a process of letting the image appear partially enlarged relative to this whole screen will be referred to as "zoom" or "zooming". Specifically, the process of "display whole→zoom to face position" is a process of first diminishing the image data of "1600×1200" to ⅗ of the original one to display the image over the whole screen (960×720) and then changing the magnification so that the display will always be "960×720" while diminishing the cut-out area of the image.

(Display Effect Process)

When such a display effect selection process is finished, the procedure goes to step S307, where the pictures of the display data are drawn continuously while changing the condition on the video memory on the basis of the selected display effect and the positional information of the face stored in the storage section, and the display effect process according to this is executed. Here, when the display effect process described below is ended, step S303 to step S307 are repeated until an instruction for an end (end instruction) is given by the user's operation of the remote controller or until the successively counted number N of the processed images reaches the total number of the images (S308 to S310). At the stage when the number N of the processed images exceeds the total number of the images, the display effect process is executed from step S302.

An appearance of the display effect process performed by display control section 110 is shown in FIG. 5. FIG. 5A shows a case in which the result of:

number of detected faces: 1 face position: (674, 288)

is obtained by the face detection process when the image data is processed. In this FIG. 5A, the result of "number of detected faces: 1" is obtained by the above-described process, and the display effect of "display whole→zoom to face position" is selected on the basis of this. Display control section 110 executes a zooming process to the face position from the display of whole on the selected image.

Namely, first the area shown by "a" in FIG. 5A is displayed over the whole screen, and continuous drawing of pictures is executed on the video memory while the magnification is gradually increased. This picture drawing process is ended when the displayed area reaches the area shown by "b".

When the display effect process on this first sheet is finished, display control section 110 executes a similar process on the second and subsequent sheets of images. For example, if the second sheet of photograph is an image data such as shown in FIG. 5B, a result of:

number of detected faces: 2
face positions: (650, 456), (840, 596)

is obtained by the face detection process. When the result of "number of detected faces: 2" is obtained by the above-described process, the display effect of "pan on the line passing through the two faces in a zoomed state" is selected by the face detection process. By this, display control section 110 executes a panning process on the selected image. Here, the line in "on the line" is preferably a straight line; however, other lines can be set as well.

Namely, in a state in which the image is zoomed, continuous drawing of pictures is executed on the video memory so that the displayed area gradually moves from area "d" to area "e" while travelling on the line shown by "c" that passes through the two face positions in FIG. 5B.

If the third sheet of photograph is an image data shown in FIG. 5C, a result of:

number of detected faces: 3
face positions: (826, 320), (1171, 421), (476, 392)

is obtained by the face detection process. When the result of "number of detected faces: 3" is obtained by the above-described process, the display effect of "zoomed display of the center-of-gravity position of all the face positions→zoom out to the whole image" is selected by the face detection process. By this, display control section 110 executes a zooming-out process on this image.

Namely, an area having a center at the position shown by "f" in FIG. 5C (area of "g" in FIG. 5C) is displayed in zoom, and thereafter continuous drawing of pictures is executed on the video memory so as to zoom out gradually to the whole lower image (area of "e" in FIG. 5).

One example of the display result by such a process of display control section 110 is shown in FIG. 6. FIGS. 6A to 6D in this order show the states of the display of the image shown in FIG. 5A. FIGS. 6E to 6H in this order show the states of the display of the image shown in FIG. 5B.

As shown in FIG. 6, according to the first embodiment, by an operation of the display control section, in a slide show that can selectively switch among a plurality of display effects, a display effect can be selected reflecting the number of faces contained in individual images and, in actual display effect processes, a process reflecting the positions of the faces can be executed.

Second Embodiment

Next, an image displaying method and an image displaying apparatus according to the second embodiment of the present invention will be described.

Instead of detecting the. "number of faces" and "positions" by the face detection process and selecting and controlling the display effects on the basis of the "number of faces" and "positions" as in the first embodiment, the second embodiment adopts a construction in which information on the "size of face area" is detected and stored into the storage section in addition to the "number of faces" and "positions".

Further, in the second embodiment, a condition is added to the display effect selection process. FIG. 7 shows one example of a display effect selection process in which the condition of "size of face area" is added to the "number of faces".

Namely, As shown in FIG. 7, when the number of detected faces is one after the face detection process, if the size of a face area is larger than or equal to a predetermined value, for example, if the width is 130 or more, a process of "display whole→zoom to face position" is selected. On the other hand, if the size of the face area is smaller than the predetermined value when the number of detected faces is one, a process of "window frame display only for the neighborhood of the face area→enlarge the frame for display of whole" is selected.

(Display Effect Process)

Next, the display effect process according to the second embodiment will be described. Namely, suppose that the result of:

number of detected faces: 1
face position: (557, 496)
size of face area: width 252, height 228 is obtained by the face detection process executed as described above, for example, in processing the image data shown in FIG. 8A.

In this case, on the basis of the result of "number of detected faces: 1" and that the size of the face area is larger than or equal to the predetermined value by the above-described process according to the second embodiment, a display effect of "display whole→zoom to face position" is selected. Then, display control section 110 executes a zooming process to the face position from the display of whole on this image.

Namely, first the area defined by "a" shown in FIG. 8C corresponding to FIG. 8A is displayed over the whole screen. Thereafter, the magnification is gradually increased and continuous drawing of pictures is executed on the video memory. This picture drawing process is ended when the displayed area reaches the area defined by "b" shown in FIG. 8C.

On the other hand, suppose that the result of:

number of detected faces: 1
face position: (674, 288)
size of face area: width 124, height 102 is obtained by the face detection process in processing the image data shown in FIG. 8B.

In this case, on the basis of the result of "number of detected faces: 1" and that the size of the face area is smaller than the predetermined value by the above-described process, a display effect of "window frame display only for the neighborhood of the face area→enlarge the frame for display of whole" is selected. Then, display control section 110 executes a zooming process to the face position from the display of whole on this image. Namely, the display effect selection at this time is processed by comparing the size of the face area with a threshold value based on the image resolution.

Namely, first the display is carried out so that only the inside of the frame defined by "c" shown in FIG. 8D corresponding to FIG. 8B is exposed. Thereafter, continuous drawing of pictures is executed on the video memory while the size of the frame is gradually enlarged. This picture drawing process is ended when the whole image is displayed.

The display result by the process of display control section 110 such as shown above will specifically be as shown in FIG. 9, for example. Namely, regarding the display of the image of FIG. 8A, the display is carried out successively as shown in FIG. 9A to FIG. 9D and, regarding the display of the image of FIG. 8B, the display is carried out successively as shown in FIG. 9E to FIG. 9H.

As described above, according to the second embodiment, an effect similar to that of the first embodiment can be produced. Also, by an operation of display control section 110, in a slide show that can selectively switch among a plurality of display effects, not only a display effect can be selected reflecting the number of faces contained in individual images but also a different display effect can be implemented depending on the size of the face area.

However, in the case of an image having a small face area, when a zooming process is carried out until the face has a sufficient size, the magnification may become larger than one, whereby a block noise or the like may become conspicuous which is generated by an image compression process, specifically, in performing a JPEG compression process, for example. If an impression on such display inconvenience becomes strong, it will not be "effective" on the user side even if a zooming process is carried out to the face position.

Therefore, this second embodiment is constructed in such a manner that, if the face area is smaller than a predetermined value, a different display effect such as shown in FIGS. 9E to 9H is selected without executing a zooming process, so as to draw pictures emphasizing on the face. By this picture drawing, the above-mentioned display inconvenience can be prevented while ensuring the effect of emphasizing the face.

Third Embodiment

Figure 10:
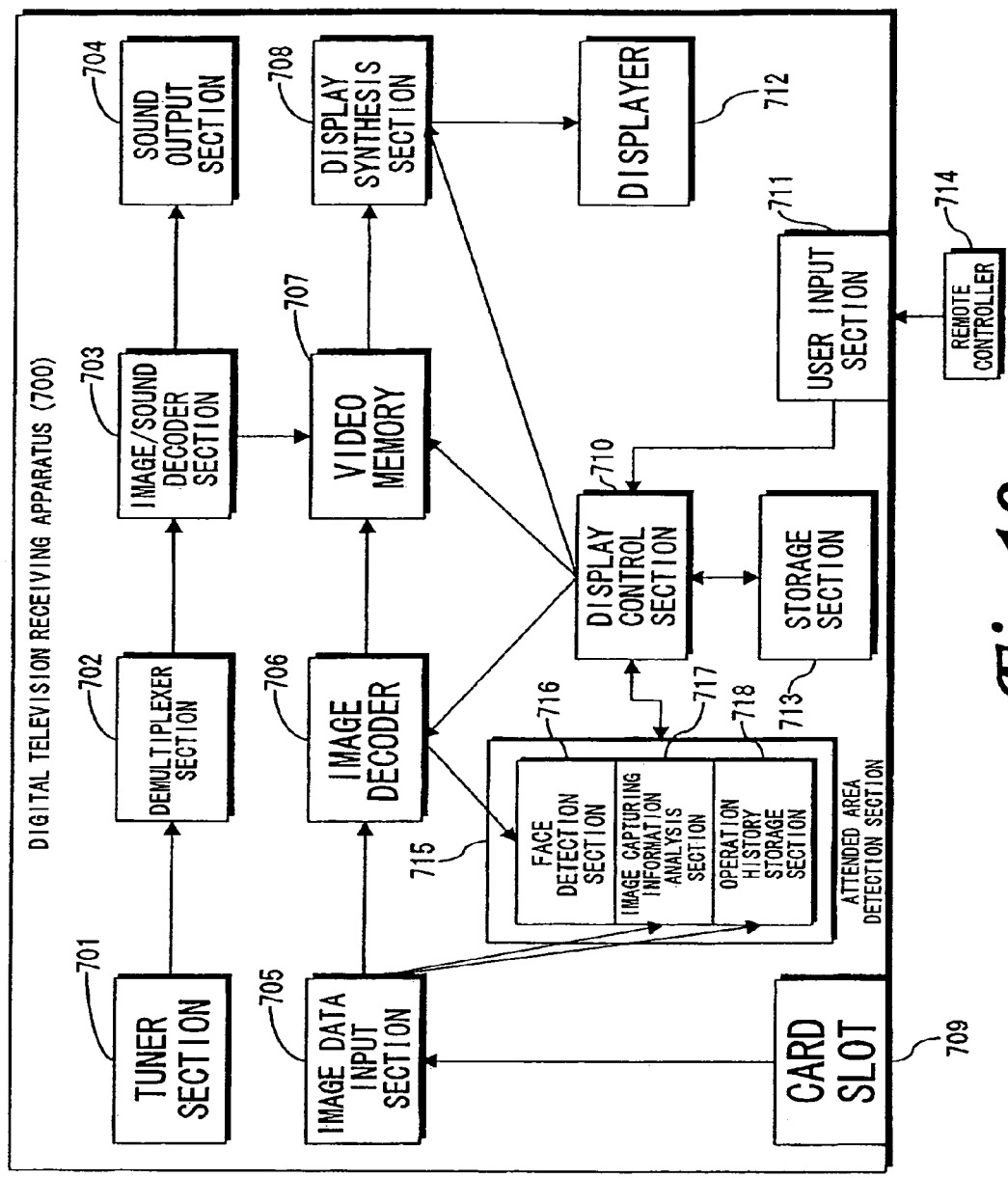
FIG. 10 is a block diagram showing a digital television receiver according to the third embodiment of the present invention.

Next, an image displaying method according to the third embodiment of the present invention will be described. This third embodiment is constructed to use, in addition to the face detection process, image-capturing information recorded when a photograph was taken and viewing/listening history information when the user viewed or listened to the corresponding photograph before, unlike the first and second embodiments in which the display effect is selected on the basis of the result of the face detection process. FIG. 10 shows a construction of a digital television receiving apparatus 700 to which the invention is applied. Here, the remote controller used in the third embodiment is similar to the remote controller used in the first embodiment (See FIG. 2), so that the description thereof will be omitted.

(Description of Each Section)

As shown in FIG. 10, a tuner section 701, a demultiplexer-section 702, a video/sound decoder 703, a sound output section 704, an image data input section 705, a video memory 707, a display synthesis section 708, and a card slot 709 constituting the digital television receiving apparatus 700 according to the second embodiment are similar to those of the above-described first embodiment, so that the description thereof will be omitted. Further, a displayer 712 used as one example in this third embodiment is made of lateral 960 pixels and longitudinal 720 pixels (960×720).

Namely, as shown in FIG. 10, an image decoder 706 is a circuit for performing a decoding process on the digital image data supplied from image data input section 705. A display control section 710 is process controlling means for giving an instruction of reading images to image data input section 705 and giving an instruction of executing a process to image decoder 706. Further, display control section 710 is process controlling means for writing display data into video memory 707, giving an instruction of a synthesizing process to display synthesis section 708, and giving an instruction of storing information to storage section 713. Also, this display control section 710 is adapted to be capable of obtaining input data from remote controller 714 via user input section 711, and is further adapted to be capable of giving an instruction to image data input section 705 for supplying data to an image-capturing information analysis section.

A face detection section 716 is a circuit that executes a process similar to the face detection process in the first and second embodiments. An image-capturing information analysis section 717 is a circuit for obtaining "in-focus position" information that was added when the image was captured, from an image file. An operation history storage section 718 is a circuit for storing a past enlargement operation history for each photograph. An attended area detection section 715 is constituted of these face detection section 716, image-capturing information analysis section 717, and operation history storage section 718.

A monitor screen in digital television receiving apparatus 700 such as shown above will be described. FIGS. 11A and 11B show one example of a monitor screen of a digital camera used in the third embodiment.

Namely, when a display shown in FIG. 11A is carried out at the time of capturing an image, a record that the rectangular area on the left side was in focus is added to the image file. On the other hand, when a display shown in FIG. 11B is carried out at the time of capturing an image, a record that the rectangular area on the right side was in focus is added to the image file.

Also, if an operation of "enlarged display" of up key 204 of the remote controller is performed by the user when the user viewed or listened to the photograph, area information of this "enlarged display" is stored as data in operation history storage section 718. Specifically, for example, when a photograph shown in FIG. 11C is displayed by being enlarged as shown in FIG. 11D by the user's operation of the remote controller, the operation history information at this time is stored as information with center coordinates (450, 800) and size (width W: 800, height H: 600) The other configuration is the same as in the first and second embodiments, so that the description thereof will be omitted.

(Processing Operation)

Figure 12:
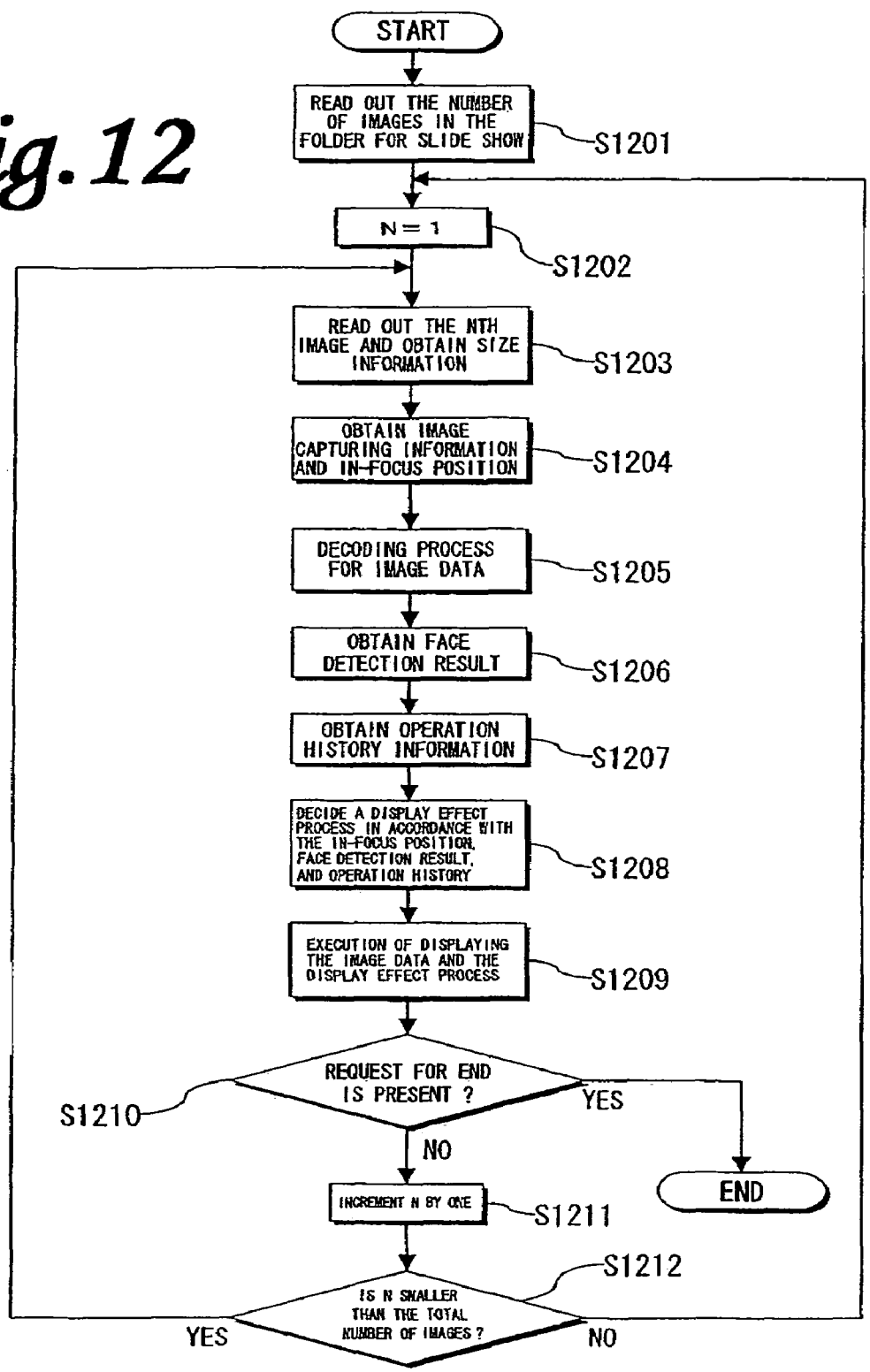
FIG. 12 is a flow chart showing an operation of a display control section according to the third embodiment of the present invention.

Next, a processing operation in the image displaying method according to the third embodiment of the invention will be described. The display of digital images in digital television receiving apparatus 700 according to the third embodiment is started by recalling an image viewer function when a memory card is mounted to card slot 709 by a user and a remote controller is operated. Here, in the following description, for simplification thereof, the number of pixels in the used image data is assumed to be 1600×1200. FIG. 12 shows part of an operation of the image viewer function of the digital television receiving apparatus. In FIG. 12, mainly the operation of display control section 710 will be shown.

(Start of Slide Show)

First, when "viewer" key 209 of the remote controller shown in FIG. 2 is pressed by a user, the process shown in FIG. 12 is started by display control section 710.

In the process shown in FIG. 12, first, in step S1201, display control section 710 reads out the total number of image files stored in the memory card inserted in card slot 709 via image data input section 705, and this value is stored into storage section 713. Next, after the number of images is set to be N=1 in step S1202, the procedure goes to step S1203, where the first sheet of image file is read out and the image size is obtained.

Thereafter, the procedure goes to step S1204, where display control section 710 supplies image file data from the image data input section to the image-capturing information analysis section, and requests the image-capturing information analysis section 717 to analyze the image-capturing information that was recorded when the image was captured. As a result of this analysis, an in-focus position is obtained, and this position is stored in storage section 713.

Next, the procedure goes to step S1205, where display control section 710 supplies the image data to image decoder 706, and a decoding process is started. Subsequently, the procedure goes to step S1206, where the image subjected to the decoding process is supplied to the face detection section, and display control section 710 gives an instruction to face detection section 716 to execute a face detection process on the image subjected to the decoding process. Then, as a result of this face detection process, the number of faces, the positions thereof, and the sizes thereof are obtained and stored into storage section 713.

Further, the procedure goes to step S1207, where display control section 710 searches operation history storage section 718 on whether the operation history on the corresponding image is present or not. If it is found by this search that there is a past history of enlargement display of the corresponding image, the center coordinates and the size are obtained and stored in storage section 713.

(Effect Decision Process)

Thereafter, the procedure goes to step S1208, and when the face detection process on the first sheet of image, the image-capturing information analysis process, and the operation history obtaining process are finished, a display effect selection process is executed on the first sheet on the basis of these results. In the third embodiment, a table shown in FIG. 13 is used, and a display effect corresponding to the presence or absence of the duplication of respective areas and the number of areas is selected.

Specifically, for example, when a duplicated area is one among the face detection position, the in-focus position, and the enlargement operation position, a display effect process of "display whole→zoom to the duplicated area (magnification: high)" is selected in accordance with the table of FIG. 13. When the number of duplicated areas is two, a display effect of "pan on the line passing through the two duplicated areas in a zoomed state (magnification: high)" is selected. When the number of duplicated areas is three or more, a display effect of "display whole→zoom to the first area (magnification: high), then pan to the second and subsequent areas" is selected.

When there are no duplicated areas and only one area has been detected in the face detection process, the image-capturing information analysis process, and the operation history obtaining process, a display effect of "display whole→zoom to the duplicated area (magnification: low) is selected. On the other hand, when there is no duplication though there are two areas, a display effect of "pan on the line passing through the two duplicated areas in a zoomed state (magnification: low)" is selected. When there is no duplication though there are three or more areas, a display effect of "zoomed display of the center-of-gravity position of all the areas→zoom out to the whole image" is selected.

(Display Effect Process)

Next, when the display effect selection process is finished, the procedure goes to step S1209, where the pictures of the display data are drawn continuously while changing the condition on the video memory on the basis of the selected display effect and the positional information of the face stored in storage section 713, and the display effect process is executed. An appearance of the display effect process performed by display control section 110 is shown in FIG. 14. Here, when the display effect process described below is ended, step S1203 to step S1209 are repeated until the user gives a request for an end or until the number N of the processed images reaches the total number of the images (S1210 to S1212). At the stage when the number N of the processed images exceeds the total number of the images, the display effect processes from step S1202 onwards are executed.

Figure 14B:
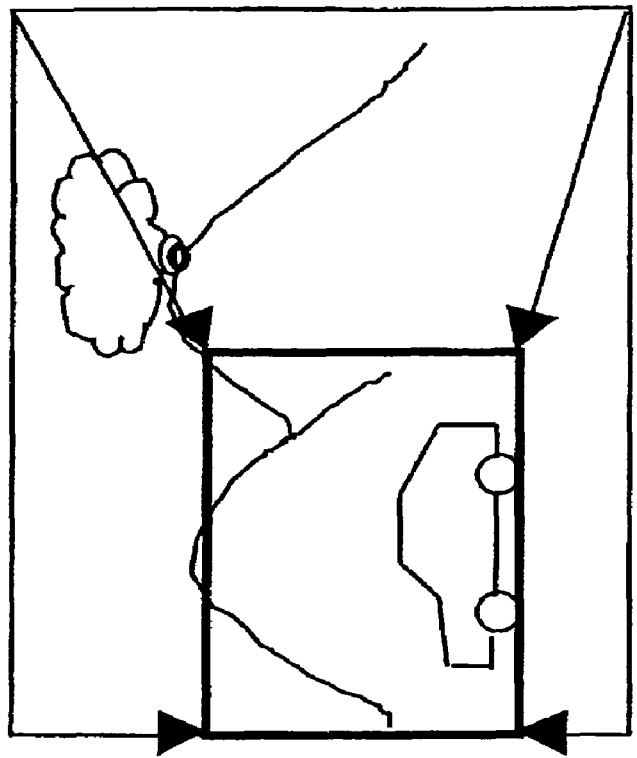
FIGS. 14A and 14B are schematic line views showing an example of a function of a display effect selection process according to the third embodiment of the present invention.
Figure 14A:
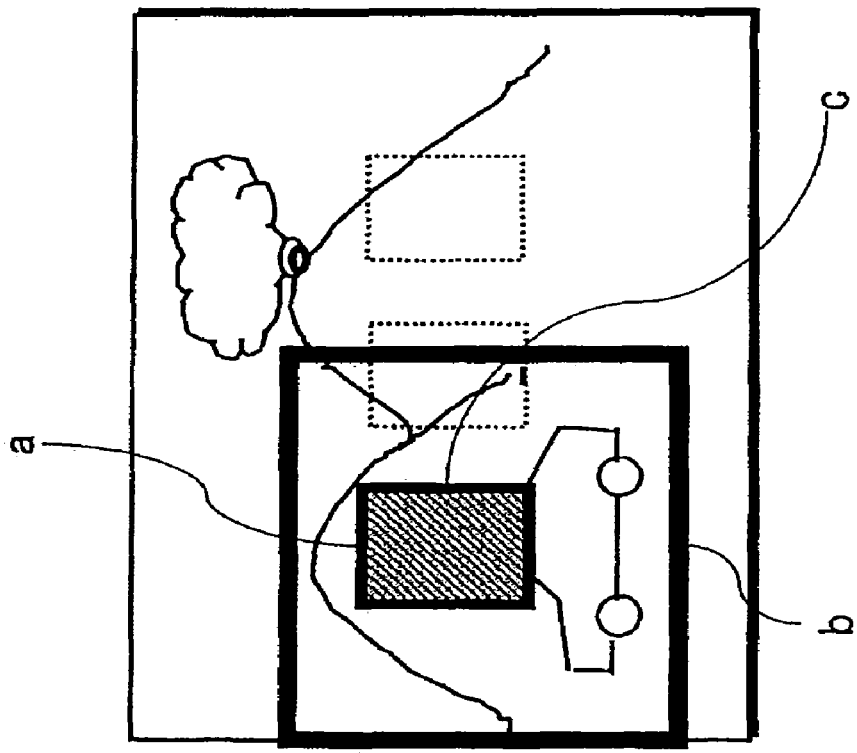

Namely, for example, when the image data shown in FIG. 14A are processed, if the area shown by "a" in FIG. 14A is an in-focus position obtained from image-capturing information analysis section 717 and the area shown by "b" in FIG. 14A is an enlarged display area obtained from operation history storage section 718, the duplicated area is one, as shown by "c" fin FIG. 14A. Therefore, a display effect of "display whole→zoom to the duplicated area (magnification: high)" is selected in accordance with the table of FIG. 13. By this, a zooming process on the duplicated area is executed as shown in FIG. 14B.

As described above, in a slide show in which a plurality of display effects can be selectively switched, by the operations of the face detection section, the image-capturing information analysis section, the operation history storage section, and the display control section according to the third embodiment, a display effect can be selected and implemented reflecting the number and position of each information of the face detection positions, the in-focus positions, and the enlarging operation positions contained in individual images, as well as the duplication relationship thereof.

Specifically, for example, if an in-focus position is present in duplication in the same area as the face detection position, there is a higher possibility that the user is paying attention to the area, as compared with the case in which only the information on the face detection position is present. In this case, a display effect can be selected and executed to emphasize more strongly the area where the in-focus position is present in duplication, such as a zooming display at a higher magnification than in the case in which only the face detection position information is present.

On the other hand, if the face detection positions, the in-focus positions, and the enlarging operation positions are in different areas, there is a possibility that the attended areas for the user are dispersed. Therefore, a display effect can be selected and executed to display each area at all times without displaying to emphasize a specific area strongly.

As shown above, the embodiments of the present invention have been specifically described; however, the invention is not limited to the above-described embodiments alone, so that various modifications can be made based on the technical idea of the invention.

For example, the numerical values raised in the above-described embodiments are merely examples, so that numerical values different from these can be used in accordance with the needs.

For example, in the above-described first embodiment, a method of detecting a skin color is used in determining whether an area is a face or not as a face detection process; however, according to the purport of the invention, the method is not limited to this, so that other methods may be employed instead.

Also, for example, in the above-described first embodiment, an example has been described in which the process is proceeded in the order of the reading process of the image data, the face detection process, the effect decision process, and the display effect process. However, on the basis of the technical idea of this invention, it is not necessarily limited to this example. For example, it is possible to execute the reading process of the (N+1)th image data, the face detection process, and the effect decision process in parallel while executing the Nth display effect process.

Further, for example, in the above-described second embodiment, a value of "130" is used as a threshold value for determining the size of the face area. However, this threshold value is one example of a threshold value determined based on the image resolution of "1600×1200" used in the above-described second embodiment, so that the threshold value for determining the size of the face area is not necessarily limited to the numerical value of 130, so that various values can be selected based on the purport of the invention. In particular, in the case of using an image having a resolution other than the image resolution (1600×1200) used in the second embodiment, it is preferable to adopt a different numerical value. Also, in the case where a plurality of image resolutions are intermixed, after each image size is obtained, a value corresponding to the resolution thereof is used.

Figure 15B:
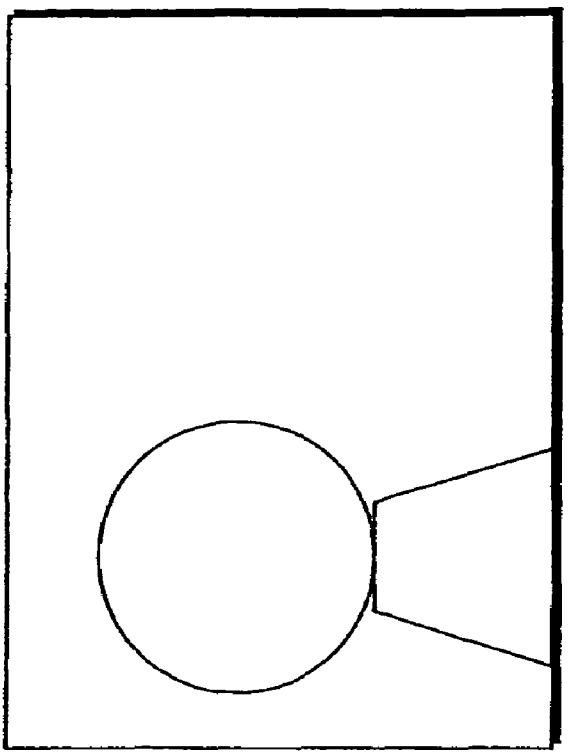
FIGS. 15A and 15B are schematic line views showing an example of a monitor screen of a digital camera having an image capturing mode for designating an imaging-object position according to another example of the third embodiment of the present invention.
Figure 15A:
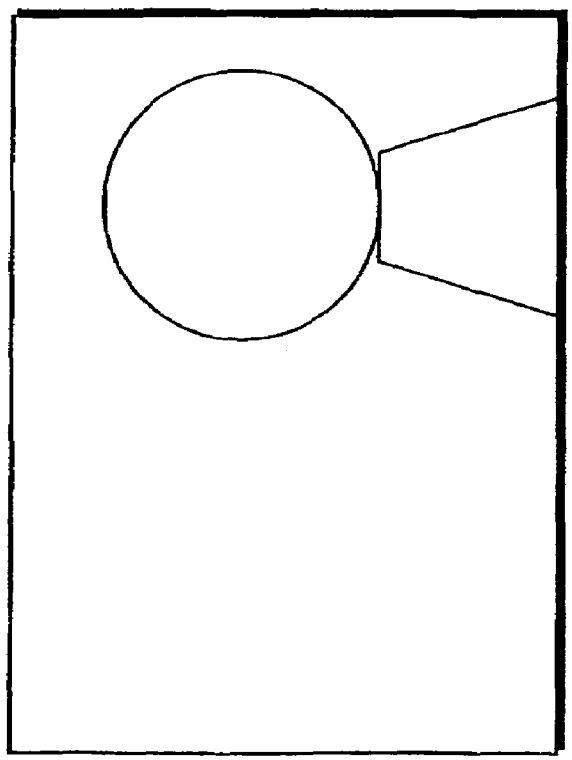

Also, for example, in the above-described third embodiment, an example has been described in which information of focus position information recorded at the time of image capturing is used. However, if for example the construction of the digital camera can set a mode in which the imaging-object position or a focus position is fixed as an image capturing scene mode, it is possible to use information of this image capturing scene mode. Specifically, for example, as shown in FIG. 15, if an image is captured using a digital camera equipped with an image capturing scene mode such as "person is on the right" or "person is on the left" and if information that "person is on the right" is present in an Exif header information of the image, it is possible to store the right side of the photograph as the imaging-object position in the storage section, for use in the display effect selection process.

In the above-described embodiments, examples have been described in which the invention is applied to a digital television receiving apparatus; however, the technical idea of the invention is not limited to this digital television receiving apparatus, so that it can be used, for example, in a form of a set top box for reproducing images captured by a digital camera or in a form of a software of a personal computer or the like. Further, it can be used in a form of a digital camera or the like having a slide show reproduction function.

This application claims priority from Japanese Patent Application No. 2003-418542 filed Dec. 16, 2003, which is hereby incorporated by reference, herein.

What is claimed is:

1. An image displaying method comprising:
   using an image processing apparatus to implement the following steps:
   an image inputting step of inputting a plurality of still images;
   a facial area detecting step of detecting facial areas of persons in each of the plurality of images;
   a display effect selecting step of selecting a display effect from a plurality of predetermined display effects for each of the plurality of still images on the basis of the number of the facial areas detected in each still image; and
   a display controlling step of a running slide show of the plurality of still images in accordance with the display effect selected with respect to each of the still images,
   wherein, in the display effect selecting step, if one facial area is detected in the still image a display effect of zooming the facial area is selected, and if several facial areas are detected in the still image a display effect of panning on the several facial areas is selected.

2. An image displaying method of claim 1, wherein if one facial area is detected in the facial area detecting step, a display effect of zooming the facial area is selected in case the size of the facial area is larger than a predetermined size, and the display effect of zooming the facial area is not selected in case the size of the facial area is smaller than the predetermined size in the display effect selecting step.

3. An image displaying method of claim 1, further comprising an in-focus position obtaining step of obtaining information of and in-focus position for each of the still images, wherein magnification of the zooming effect selected in the display effect selecting step is larger when the facial area in the still image overlaps with the in-focus position than when the facial area does not overlap with the in-focus position.

4. An image displaying method of claim 1, further comprising an operation history obtaining step of obtaining operation history information regarding an enlarged position where an enlarged display is performed by user operation, wherein magnification of a zooming effect selected in the display effect selecting step is larger when the facial area in the still image overlaps with the enlarged position than when the facial area does not overlap with the enlarged position.

5. A computer-readable medium storing a computer-executable program implementing a method according to claim 1.

6. An image displaying apparatus comprising:
   displaying means for displaying an image;
   image data obtaining means for obtaining a plurality of still image data;
   facial area detecting means for detecting facial areas of persons in each of the plurality of still images;
   display effect selecting means for selecting a display effect from a plurality of predetermined display effects for each of the plurality of the still images on the basis of the number of facial areas detected in each still image; and
   display controlling means for displaying running a slide show of the plurality of still images on the displaying means in accordance with the display effect selected with respect to each of the still images;
   wherein if one facial area is detected in the still image the display effect selecting means selects a display effect of zooming the facial area, and if several facial areas are detected in the still image the display effect selecting means selects a display effect of panning on the several facial areas.

* * * * *